United States Patent [19]

Ma

[11] Patent Number: 5,721,330

[45] Date of Patent: Feb. 24, 1998

[54] MACROMONOMERS WITH HIGH ACID CONTENT AND THEIR METHOD OF PREPARATION

[75] Inventor: Sheau-Hwa Ma, Chadds Ford, Pa.

[73] Assignee: E. I. du Pont de Nemours and Company, Wilmington, Del.

[21] Appl. No.: 573,307

[22] Filed: Dec. 15, 1995

[51] Int. Cl.$^6$ .................. C08F 220/26; C08F 220/06; C08F 2/38; C08F 2/14

[52] U.S. Cl. .................. 526/318.41; 526/328.5; 526/82

[58] Field of Search .................. 526/318.41, 328.5, 526/82

[56] References Cited

U.S. PATENT DOCUMENTS

| | | | |
|---|---|---|---|
| 5,028,677 | 7/1991 | Janowicz | 526/329.7 |
| 5,231,131 | 7/1993 | Chu et al. | 524/504 |

OTHER PUBLICATIONS

P. Cacioli, D. G. Hauethorne, R. L. Laslett, E. Rizzardo, and D. H. Solomon, J. Macromol. Sci.–Chem., A23 (7), 839–852, 1986.

Primary Examiner—Joseph L. Schofer
Assistant Examiner—Wu C. Cheng

[57] ABSTRACT

A macromonomer composition, wherein at least 80 mol % of the macromonomer is a random copolymer of 2 to 1,000 units of monomers and having a very high content of acid monomers, i.e. >50% by weight of acid monomers, and an end group linked to the random copolymer having the formula:

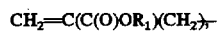

wherein $R_1$ is selected from the group consisting essentially of H; an alkyl group of 1 to 8 carbon atoms; and $X_n(CH_2CH_2O)_m$—$R_4$ wherein n is 0 or 1, X is an alkyl, aryl or alkaryl diradical connecting group of 1 to 9 carbon atoms, m is 2 to 50, and $R_4$ is H or an alkyl group of 1 to 4 carbon atoms. These macromonomers can be used effectively in solution form to prepare structured polymers such as block copolymers and graft copolymers for industrial applications.

20 Claims, No Drawings

MACROMONOMERS WITH HIGH ACID CONTENT AND THEIR METHOD OF PREPARATION

FIELD OF THE INVENTION

This invention relates to novel compositions of macromonomers having a very high content of acid monomers, i.e. >50% by weight of acid monomers in the macromonomer, and a comonomer containing multiple ethylene oxide units. This invention also relates to their method of preparation.

BACKGROUND OF THE INVENTION

Macromonmers are polymers with an olefinic polymerizable end group. They can be effectively used to synthesize structured copolymers such as graft copolymers to meet the needs of a wide range of industrial applications. An important example is as an aqueous pigment dispersant. A useful pigment dispersant polymer for an aqueous system should have a hydrophobic section for binding with the pigment surface and a hydrophilic section for providing the solubility in the aqueous carrier medium and dispersion stability. The dispersion stability is maximized when the properties especially the solubility of the two sections in the selected aqueous carrier medium are as different as possible. The carboxylic acid groups are ionizable in the presence of bases and have been effectively used in the hydrophilic section of a block copolymer or a graft copolymer for such purpose, and macromonomers with high content of acid monomers are useful as building blocks for these dispersant polymers.

Macromonomers with high content of acid monomers have been disclosed by Janowicz in U.S. Pat. No. 5,028,677 and by Chu et al in U.S. Pat. No. 5,231,131. However, according to "Polymer Handbook", 2nd edition, edited by J. Brandrup amd E. H. Immergut, the choices of solvents for homopolymer poly(acrylic acid) and poly(methacrylic acid) are extremely limited. The poly(acrylic acid) is soluble only in water, diluted aqueous alkali solution, low alcohols such as methanol and ethanol, ethylene glylcol, methoxyethanol, dioxane, formamide, and DMF. The poly(methacrylic acid) is soluble only in water, and diluted aqueous HCl or alkali solution. This poses a serious practical problem for synthesis of macromonomers with high acid content since macromonomers are most efficiently synthesized by a solution polymerization method in the presence of a chain transfer agent. The common chain transfer agents, especially some of the more economically feasible cobalt complexes, are completely insoluble in water, and have limited solubility in polar solvent. Furthermore, the macromonomer is preferably further polymerized to form a block or graft copolymer by a solution polymerization method where molecular weight of the finished polymer can be easily controlled by a number of conventional methods. In addition, neither of the references disclosed the use of monomers having multiple units of ethylene oxide in their structure.

Accordingly, macromonomers with a very high acid monomer content are needed, wherein the macromonomers are soluble in the organic solvents used in common polymerization methods by which macromonomers are prepared. A need also exists for macromonomers with a very high acid monomer content for use in the preparation of structured polymers such as block copolymers and graft copolymers suitable as aqueous pigment dispersants and for other applications.

SUMMARY OF THE INVENTION

The present invention provides a novel macromonomer composition wherein at least 80 mol % of the macromonomer comprises:

(I) a random copolymer of 2 to 1,000 units of monomers; wherein the random copolymer contains:

(a) at least 50% by weight, based on the total weight of the macromonomer, of at least one monomer having the formula:

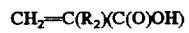

$$CH_2=C(R_2)(C(O)OH)$$

wherein $R_2$ is H or $CH_3$; and (b) approximately 2 to 50% by weight, based on the total weight of the macromonomer, of at least one monomer of the formula:

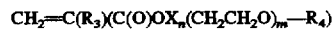

$$CH_2=C(R_3)(C(O)OX_n(CH_2CH_2O)_m-R_4)$$

wherein n is 0 or 1; X is an akyl, aryl, or alkaryl diradical connecting group of 1 to 9 carbon atoms; m is 2 to 50; $R_3$ is H or $CH_3$; and $R_4$ is H or an alkyl group of 1 to 4 carbon atoms; and (II) an end group linked to the random copolymer and having the formula:

$$CH_2=C(C(O)OR_1)(CH_2)-$$

wherein $R_1$ is selected from the group consisting essentially of H; an alkyl group of 1 to 8 carbon atoms; a hydroxyalkyl group of 1 to 8 carbon atoms and $X_n(CH_2CH_2O)_m-R_4$ wherein n=0 or 1, X is an alkyl, aryl or alkaryl diradical connecting group of 1 to 9 carbon atoms, m is 2 to 50, and $R_4$ is H or an alkyl group of 1 to 4 carbon atoms.

In another embodiment of the invention is described a process for free radical polymerization of an acid monomer and a comonomer, in the presence of a chain transfer agent in an organic solvent, to form a macromonomer having the following composition, wherein at least 80 mol % of the macromonomer comprises:

(I) a random copolymer of 2 to 1,000 units of monomers; wherein the random copolymer contains:

(a) at least 50% by weight, based on the total weight of the macromonomer, of at least one monomer having the formula:

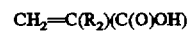

$$CH_2=C(R_2)(C(O)OH)$$

wherein $R_2$ is H or $CH_3$; and (b) approximately 2 to 50% by weight, based on the total weight of the macromonomer, of at least one monomer of the formula:

$$CH_2=C(R_3)(C(O)OX_n(CH_2CH_2O)_m-R_4)$$

wherein n is 0 or 1; X is an akyl, aryl, or alkaryl diradical connecting group of 1 to 9 carbon atoms; m is 2 to 50; $R_3$ is H or $CH_3$; and $R_4$ is H or an alkyl group of 1 to 4 carbon atoms; and (II) an end group linked to the random copolymer and having the formula:

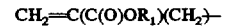

$$CH_2=C(C(O)OR_1)(CH_2)-$$

wherein $R_1$ is selected from the group consisting essentially of H; an alkyl group of 1 to 8 carbon atoms; a hydroxyalkyl group of 1 to 8 carbon atoms and $X_n(CH_2CH_2O)_m-R_4$ wherein n is 0 or 1, X is an alkyl, aryl or alkaryl diradical connecting group of 1 to 9 carbon atoms, m is 2 to 50, and $R_4$ is H or an alkyl group of 1 to 4 carbon atoms. Preferably, the chain transfer agents are cobalt (II) and cobalt (III) complexes or organic chain transfer agents that are capable of chain transfer by addition fragmentation mechanisms.

These macromonomers can be effectively used in solution form to prepare structured polymers such as block copolymers and graft copolymers for industrial applications.

DETAILED DESCRIPTION OF THE INVENTION

The present invention provides novel compositions of macromonomers having a polymerizable terminal double bond, a very high weight percentage of (meth)acrylic acid monomers, and a comonomer containing poly(oxyethylene) glycol group. The presence of such comonomers has drastically changed the solubility of the macromonomer through the interaction or hydrogen bonding of the carboxylic groups and the ethylene oxide units on the comonomers. Hence, they can be easily prepared in commonly used organic solvents and used as such for further solution polymerization reactions to prepare structured polymers such as block copolymers and graft copolymers.

The macromonomer of the present invention is a copolymer of an acid monomer selected from the group consisting of acrylic acid and methacrylic acid and mixtures thereof, preferably methacrylic acid, and at least one comonomer selected from the group of monomers having the formula:

$CH_2=C(R_3)(C(O)OX_n(CH_2CH_2O)_m-R_4)$ wherein n is 0 or 1; when n is 1, X is an alkyl, aryl, or alkaryl diradical connecting group of 1 to 9 carbon atoms; m is 2 to 50, $R_3$ is H or $CH_3$, and $R_4$ is H or an alkyl group of 1 to 4 carbon atoms. Useful examples of such comonomers include 2-(2-methoxyethoxy) ethyl acrylate, 2-(2-methoxyethoxy) ethyl methacrylate, ethoxytriethyleneglycol methacrylate, methoxy polyethyleneglycol monomethacrylate (molecular weight of 200–100), polyethyleneglycol monomethacrylate (molecular weight 200–1000).

A minor amount (<10% by weight) of other commonly used (meth)acrylate monomers may be copolymerized into the macromonomer provided they do not drastically change the solubility of the macromonomer in the selected solvent system. Useful examples include the alkyl (meth)acrylate with the alkyl group having 1 to 8 carbons such as, for example, methyl methacrylate, ethyl methacrylate, butyl methacrylate, etc., and hydroxyalkyl (meth)acrylate with the alkyl group having 1 to 8 carbon atoms such as 2-hydroxyethyl methacrylate, hydroxypropyl methacrylate, etc.

The end group (II) is generated by the chain transfer/termination reaction between the radical center of an active polymer chain and the chain transfer agent. Hence, the last monomer added to the polymer chain before the chain transfer/termination reaction determines the structure of the end group. The $R_1$ group is H when the last monomer added to the polymer chain is methacrylic acid, $X_n(CH_2CH_2O)_m-R_4$ when the ethylene oxide containing comonomer is the last monomer added to the polymer chain and other structures when other monomers are used.

The macromonomer compositions of the present invention can be prepared by free radical polymerization of an acid monomer and a comonomer, in the presence of a chain transfer agent in an organic solvent. The chain transfer agent that is employed may be selected from cobalt (II) and cobalt (III) complexes as a catalytic chain transfer agent or an organic chain transfer agent that is capable of chain transfer by addition fragmentation mechanism. The organic chain transfer agents include allylic sulfides, allylic bromides, methacrylic dimers, α-methylstyrene dimer and related compounds. The cobalt complexes are preferred for practicing this invention because they are not only effective in controlling the molecular weights of the polymers produced, but also act to produce polymer compositions containing a very high percentage of macromonomers, polymers with a polymerizable terminal double bond. Preferred cobalt chain transfer agents are disclosed U.S. Pat. No. 4,680,352 to Janowicz et al and U.S. Pat. No. 4,722,984 to Janowicz. More preferred are pentacyanocobaltate (II), diaquabis (borondifluorodimethyl glyoximato) cobaltate (II), and diaquabis(borondifluorodiphenyl glyxoimato) cobaltate (II). Most preferred is diaquabis-(borondifluorodiphenyl glyoximato) cobaltate (II) because it can be easily synthesized at high yields and is stable for long term storage. Other Co(III) complexes such as isopropylaquabis(borondifluorodimethyl glyoximato) cobaltate (III), ethylaquabis (borondifluorodiphenyl glyoximato) cobaltate (III) and isopropylaquabis-(borondifluorodiethyl glyoximato) cobaltate (III) can also be effectively used for the macromonomer synthesis.

The cobalt chain transfer agent can be employed in a concentration in the range of approximately $1\times10^{-8}M$ to $5\times10^{-3}M$. The optimal concentration is dependent on the desired molecular weight and the weight percentage of the acid monomer. For macromonomers of very high acid monomer content, i.e. >70% by weight, based on the total weight of the macromonomer, and low molecular weight, for example, 1,000 to 7,500, the concentration of the cobalt chain transfer agent needs to be at the high end of the specified range. The required cobalt chain transfer agent concentration is also dependent on the viscosity of the solution. As the macromonomers having high number of acid groups tend to build viscosity through hydrogen bonding, especially at high polymer concentrations, a higher concentration of the chain transfer agent is needed for the more viscous solution. The useful concentration can be obtained through routine experimentation by one skilled in the art of polymerization. By using the suggested range of the concentrations for the chain transfer agents, macromonomers of the molecular weight in the range of 1,000 to 50,000, preferably 1,000 to 10,000, can be conveniently prepared for various industrial applications.

Many commom polar organic solvents are suitable as the polymerization media for this invention. These include but are not limited to alcohols (such as methanol, ethanol, n-propanol and isopropanol), ketones (such as acetone, butanone, pentanone and hexanone), ethers (such as tetrahydrofuran and diethyl ether), and the commonly available ethylene glycol and polyethylene glycol monoalkyl and dialkyl ethers, such as cellosolves and carbitols, alkyl esters of acetic, propionic, and butyric acids, glycols such as ethylene glycol, and mixtures thereof. Mixtures of low molecular weight alcohols such as methanol and isopropanol and low molecular weight ketones, such as acetone, are particularly useful for practicing this invention.

Any of the commonly used azo polymerization initiators are suitable provided the initiator has solubility in the solution of the solvents and the monomer mixture, and has an appropriate half life at the temperature of polymerization. "Appropriate half life", as used herein, is a half life of about 10 minutes to 4 hours. Examples of such initiators include 2,2'-azobis(isobutyronitrile), 2,2'-azobis(2,4-dimethylvaleronitrile), 2,2'-azobis(methylbutyronitrile), and 1,1'-azobis(cyanocyclohexane). Other non-azo initiators including, among others, benzoyl peroxide, lauroyl peroxide, may also be used provided they do not adversely react with chain transfer agents under the reaction conditions.

The polymerization process may be carried out in a batch or feed process. To ensure maximum catalyst activity the polymerizations should be carried out in the substantial absence of oxygen under an inert atmosphere, such as nitrogen, argon or other nonoxidizing gas. The resulting macromoners may be isolated by stripping off the solvent and the unreacted monomers or by precipitation with a nonsolvent. Preferably, the polymer solution is used as is for further applications.

Industrial Applicability

The macromonomers of this invention can be conveniently used to prepare structured polymers such as block copolymers and graft/comb copolymers for a wide range of industrial applications. These applications include use as dispersants for solid particulates in an aqueous solution, as stabilizers for latex preparation, as compatibilizers for polymer blends, etc. These structured polymers can also be used as binders in coatings for properties, such as the ease of development of an aqueous photopolymer coating, that cannot be easily obtained with a linear polymer. Furthermore, they can be easily manufactured on an industrial scale at a reasonable cost.

The invention is further illustrated by, but not limited to, the following examples.

EXAMPLES

Control 1:

This shows the preparation of a homomacromonomer of methacrylic acid in a mixture of isopropanol and acetone.

| INGREDIENTS | WEIGHT (GM) |
| --- | --- |
| Portion 1 | |
| Methacrylic acid monomer | 82.5 |
| Isopropanol | 530.5 |
| Acetone | 77.5 |
| Portion 2 | |
| Diaquabis(borondifluorodiphenyl glyoximato) cobaltate (II), Co(DPG—BF$_2$) | 0.11 |
| 2,2'-azobis(methylbutyronitrile), (Vazo ® 67 by DuPont Co., Wilmington, DE) | 0.65 |
| Acetone | 21.5 |
| Portion 3 | |
| Methacrylic acid monomer | 329.5 |
| Portion 4 | |
| Diaquabis(borondifluorodiphenyl glyoximato) cobaltate (II), Co(DPG—BF$_2$) | 0.11 |
| 2,2'-azobis(methylbutyronitrile), (Vazo ® 67 by DuPont Co., Wilmington, DE) | 4.5 |
| Acetone | 47.5 |
| Portion 5 | |
| Diaquabis(borondifluorodiphenyl glyoximato) cobaltate (II), Co(DPG—BF$_2$) | 0.044 |
| 2,2'-azobis(2,4-dimethylvaleronitrile), (Vazo ® 52 by DuPont Co., Wilmington, DE) | 1.9 |
| Acetone | 40.5 |
| Portion 6 | |
| Diaquabis(borondifluorodiphenyl glyoximato) cobaltate (II), Co(DPG—BF$_2$) | 0.066 |
| 2,2'-azobis(2,4-dimethylvaleronitrile), (Vazo ® 52 by DuPont Co., Wilmington, DE) | 1.9 |
| Acetone | 40.5 |

(Note: The preferred chain transfer agent diaquabis(borondifluorodiphenyl glyoximato) cobaltate (II) is insoluble in polar solvent such as isopropanol. Acetone is used to improve its solubility in the reaction mixture.)

The Portion 1 mixture was charged into a 3 liter flask equipped with a thermometer, stirrer, additional funnels, reflux condenser and a means of maintaining a nitrogen blanket over the reactants. The mixture was heated to reflux temperature and refluxed for about 20 minutes. The Portion 2 solution was added. Subsequently, Portion 3 and 4 were simultaneously added while the reaction mixture was held at reflux temperature at about 72° C. The addition of Portion 3 was completed in 4 hours and the addition of Portion 4 was completed in 90 minutes. When the addition of Portion 4 was completed, the addition of Portion 5 was begun and was completed in 75 minutes. Portion 6 was going to be added over a period of 75 minutes while the reaction mixture was held at reflux temperature. However, very serious precipitation of the polymer occurred while there was still about 25% of methacrylic acid left in the additional funnel. The precipitated homopolymer of methacrylic acid began to decompose quickly due to the local heat buildup. The reaction was abandoned.

The theoretical solid percent for 100% conversion is 35%.

Control 2:

This shows the preparation of a macromonomer, methyl methacrylate-co-methacrylic acid, 15/85 by weight.

| INGREDIENTS | WEIGHT (GM) |
| --- | --- |
| Portion 1 | |
| Methacrylic acid monomer | 35.1 |
| Methyl methacrylate monomer | 6.2 |
| Isopropanol | 265.3 |
| Acetone | 38.8 |
| Portion 2 | |
| Diaquabis(borondifluorodiphenyl glyoximato) cobaltate (II), Co(DPG—BF$_2$) | 0.052 |
| 2,2'-azobis(methylbutyronitrile), (Vazo ® 67 by DuPont Co., Wilmington, DE) | 0.33 |
| Acetone | 10.8 |
| Portion 3 | |
| Methacrylic acid monomer | 140.0 |
| Methyl methacrylate monomer | 24.7 |
| Portion 4 | |
| Diaquabis(borondifluorodiphenyl glyoximato) cobaltate (II), Co(DPG—BF$_2$) | 0.052 |
| 2,2'-azobis(methylbutyronitrile), (Vazo ® 67 by DuPont Co., Wilmington, DE) | 1.88 |
| Acetone | 23.8 |
| Portion 5 | |
| Diaquabis(borondifluorodiphenyl glyoximato) cobaltate (II), Co(DPG—BF$_2$) | 0.021 |
| 2,2'-azobis(2,4-dimethylvaleronitrile), (Vazo ® 52 by DuPont Co., Wilmington, DE) | 1.0 |
| Acetone | 20.3 |
| Portion 6 | |
| Diaquabis(borondifluorodiphenyl glyoximato) cobaltate (II), Co(DPG—BF$_2$) | 0.031 |
| 2,2'-azobis(2,4-dimethylvaleronitrile), (Vazo ® 52 by DuPont Co., Wilmington, DE) | 1.0 |
| Acetone | 20.3 |

The procedure described in Control 1 was followed. The polymer began precipitating from the solution when there was about 25 ml of monomer mixture left in the additional funnel. The heat was reduced to about 68° C. which was below the reflux temperature. The addition of monomers and the initiator solution was completed, and the reaction mixture was stirred for another 1 hour as planned. However, the reaction temperature had to be kept below the reflux temperature to avoid any polymer solid formation. This would have been a difficult task if large quantities of polymer were being manufactured.

The resulting macromonomer solution was clear and had a solid content of about 33.6%. This macromonomer contained 15% of methyl methacrylate and 85% of methacrylic acid and had a weight averge molecular weight of 5,370 and a number average molecular weight of 3,400 as measured by Gel Permeation Chromatography (GPC) on a methylated macromonomer sample using polymethyl methacrylate as the standard. The molecular weight was higher and the macromonomer solution was more viscous compared to the Example 3 described below where a macromonomer containing 85% by weight of methacrylic acid was easily prepared by using a comonomer having 3 ethylene oxide units in its structure.

Control 3:

This shows the preparation of a homomacromonomer containing methacrylic acid in the presence of Liponic® EG-1.

| INGREDIENTS | WEIGHT (GM) |
|---|---|
| Portion 1 | |
| Methacrylic acid monomer | 41.3 |
| Liponic ® EG-1, Lipo Chemical Co., Paterson, NJ[1] | 41.2 |
| Isopropanol | 224.1 |
| Acetone | 38.8 |
| Portion 2 | |
| Diaquabis(borondifluorodiphenyl glyoximato) cobaltate (II), Co(DPG—BF$_2$) | 0.055 |
| 2,2'-azobis(methylbutyronitrile), (Vazo ® 67 by DuPont Co., Wilmington, DE) | 0.33 |
| Acetone | 10.8 |
| Portion 3 | |
| Methacrylic acid monomer | 164.8 |
| Portion 4 | |
| Diaquabis(borondifluorodiphenyl glyoximato) cobaltate (II), Co(DPG—BF$_2$) | 0.055 |
| 2,2'-azobis(methylbutyronitrile), (Vazo ® 67 by DuPont Co., Wilmington, DE) | 1.9 |
| Acetone | 23.8 |
| Portion 5 | |
| Diaquabis(borondifluorodiphenyl glyoximato) cobaltate (II), Co(DPG—BF$_2$) | 0.022 |
| 2,2'-azobis(2,4-dimethylvaleronitrile), (Vazo ® 52 by DuPont Co., Wilmington, DE) | 0.95 |
| Acetone | 20.3 |
| Portion 6 | |
| Diaquabis(borondifluorodiphenyl glyoximato) cobaltate (II), Co(DPG—BF$_2$) | 0.033 |
| 2,2'-azobis(2,4-dimethylvaleronitrile), (Vazo ® 52 by DuPont Co., Wilmington, DE) | 0.95 |
| Acetone | 20.3 |

[1]Liponic ® EG-1 is an oligomer containing approximately 20 units of ethylene oxide.

The procedure described in Control 1 was followed. Very heavy precipitation of polymer occured during the reaction and decomposition followed. The theoretical solid percent for 100% conversion is 35%. This control experiment shows that the ethylene oxide units on an additive or cosolvent, such as Lipoinic® EG-1, at about 20% of the macromonomer weight, was not able to modify the solubility of the macromonomer and keep it in the reaction mixture for a complete polymerization.

Example 1

This shows the preparation of macromonomer ethoxytriethyleneglycol methacrylate-co-methacrylic acid, 48.8/51.2 by weight.

| INGREDIENTS | WEIGHT (GM) |
|---|---|
| Portion 1 | |
| Methacrylic acid monomer | 42.2 |
| Ethoxytriethyleneglycol methacrylate monomer | 40.2 |
| Isopropanol | 305.0 |
| Acetone | 155.0 |
| Portion 2 | |
| Diaquabis(borondifluorodiphenyl glyoximato) cobaltate (II), Co(DPG—BF$_2$) | 0.069 |
| 2,2'-azobis(2,4-dimethylvaleronitrile), (Vazo ® 52 by DuPont Co., Wilmington, DE) | 0.54 |
| Acetone | 21.5 |
| Portion 3 | |
| Methacrylic acid monomer | 168.8 |
| Ethoxytriethyleneglycol methacrylate monomer | 160.8 |
| Portion 4 | |
| Diaquabis(borondifluorodiphenyl glyoximato) cobaltate (II), Co(DPG—BF$_2$) | 0.137 |
| 2,2'-azobis(2,4-dimethylvaleronitrile), (Vazo ® 52 by DuPont Co., Wilmington, DE) | 6.5 |
| Acetone | 128.5 |

The Portion 1 mixture was charged into a 3 liter flask equipped with a thermometer, stirrer, additional funnels, reflux condenser and a means of maintaining a nitrogen blanket over the reactants. The mixture was heated to reflux temperature and refluxed for about 20 minutes. The Portion 2 solution was added. Subsequently, Portion 3 and 4 were simultaneously added while the reaction mixture was held at reflux temperature at about 72° C. over the period of 3 hours and 15 minutes. The reaction mixture was refluxed for another hour to give a clear, thin macromonomer solution with a solid content of about 58%. The resulting macromonomer contained 48.8% of ethoxytriethyleneglycol methacrylate and 51.2% of methacrylic acid and had a weight averge molecular weight of 1,340 and a number average molecular weight of 1,090 as measured by Gel Permeation Chromatography (GPC) on a methylated macromonomer sample using polymethyl methacrylate as the standard.

This example demonstrates that the incorporation of 48.8% of the comonomer of the invention allows for the polymerization reaction to be carried out smoothly at a much higher solids content than all the control experiments, resulting in a low molecular weight macromonomer.

Example 2

This shows the preparation of macromonomer ethoxytriethyleneglycol methacrylate-co-methacrylic acid, 32.3/67.7 by weight

| INGREDIENTS | WEIGHT (GM) |
|---|---|
| Portion 1 | |
| Methacrylic acid monomer | 55.8 |
| Ethoxytriethyleneglycol methacrylate monomer | 26.6 |
| Isopropanol | 305.0 |
| Acetone | 155.0 |
| Portion 2 | |
| Diaquabis(borondifluorodiphenyl glyoximato) cobaltate (II), Co(DPG—BF$_2$) | 0.069 |
| 2,2'-azobis(2,4-dimethylvaleronitrile), (Vazo ® 52 | 0.54 |

| INGREDIENTS | WEIGHT (GM) |
|---|---|
| by DuPont Co., Wilmington, DE) | |
| Acetone | 21.5 |
| Portion 3 | |
| Methacrylic acid monomer | 223.1 |
| Ethoxytriethyleneglycol methacrylate monomer | 106.5 |
| Portion 4 | |
| Diaquabis(borondifluorodiphenyl glyoximato) cobaltate (II), Co(DPG—BF$_2$) | 0.137 |
| 2,2'-azobis(2,4-dimethylvaleronitrile), (Vazo ® 52 by DuPont Co., Wilmington, DE) | 6.51 |
| Acetone | 128.5 |

The procedure was similar to Example 1. The resulting macromonomer solution was clear and thin with a solid content of about 48%. This macromonomer contained 32.3% of ethoxytriethyleneglycol methacrylate and 67.7% of methacrylic acid and had a weight averge molecular weight of 4,220 and a number average molecular weight of 2,410 as measured by Gel Permeation Chromatography (GPC) on a methylated macromonomer sample using polymethyl methacrylate as the standard.

This example demonstrates that the incorporation of 32.3% of the comonomer of the invention allows for the polymerization reaction to be carried out smoothly at a much higher percentage of solids than all the control experiments.

Example 3

This shows the preparation of macromonomer ethoxytriethyleneglycol methacrylate-co-methacrylic acid, 15/85 by weight

| INGREDIENTS | WEIGHT (GM) |
|---|---|
| Portion 1 | |
| Methacrylic acid monomer | 70.1 |
| Ethoxytriethyleneglycol methacrylate monomer | 12.4 |
| Isopropanol | 530.5 |
| Acetone | 77.5 |
| Portion 2 | |
| Diaquabis(borondifluorodiphenyl glyoximato) cobaltate (II), Co(DPG—BF$_2$) | 0.1035 |
| 2,2'-azobis(methylbutyronitrile), (Vazo ® 67 by DuPont Co., Wilmington, DE) | 0.78 |
| Acetone | 21.5 |
| Portion 3 | |
| Methacrylic acid monomer | 280.1 |
| Ethoxytriethyleneglycol methacrylate monomer | 49.4 |
| Portion 4 | |
| Diaquabis(borondifluorodiphenyl glyoximato) cobaltate (II), Co(DPG—BF$_2$) | 0.1035 |
| 2,2'-azobis(methylbutyronitrile), (Vazo ® 67 by DuPont Co., Wilmington, DE) | 4.5 |
| Acetone | 47.5 |
| Portion 5 | |
| Diaquabis(borondifluorodiphenyl glyoximato) cobaltate (II), Co(DPG—BF$_2$) | 0.041 |
| 2,2'-azobis(2,4-dimethylvaleronitrile), (Vazo ® 52 by DuPont Co., Wilmington, DE) | 2.3 |
| Acetone | 40.5 |
| Portion 6 | |
| Diaquabis(borondifluorodiphenyl glyoximato) cobaltate (II), Co(DPG—BF$_2$) | 0.062 |
| 2,2'-azobis(2,4-dimethylvaleronitrile), (Vazo ® 52 by DuPont Co., Wilmington, DE) | 2.3 |
| Acetone | 40.5 |

The Portion 1 mixture was charged into a 3 liter flask equipped with a thermometer, stirrer, additional funnels, reflux condenser and a means of maintaining a nitrogen blanket over the reactants. The mixture was heated to reflux temperature and refluxed for about 20 minutes. The Portion 2 solution was added. Subsequently, Portion 3 and 4 were simultaneously added while the reaction mixture was held at reflux temperature at about 72° C. The addition of Portion 3 was completed in 4 hours and the addition of Portion 4 was completed in 90 minutes. When the addition of Portion 4 was completed, the addition of Portion 5 was begun and was completed in 75 minutes. Portion 6 was added over a period of 75 minutes while the reaction mixture was held at reflux temperature throughout the course of the additions. Reflux was continued for another hour and the solution was cooled to room temperature.

The resulting macromonomer solution was a clear thin polymer solution and had a solid content of about 34.8%. The macromonomer contained 15% of ethoxytriethyleneglycol methacrylate and 85% of methacrylic acid and had a weight averge molecular weight of 3,330 and a number average molecular weight of 1,980 as measured by Gel Permeation Chromatography (GPC) on a methylated macromonomer sample using polymethyl methacrylate as the standard.

Example 4

This shows the preparation of macromonomer ethoxytriethyleneglycol methacrylate-co-methacrylic acid, 10/90 by weight

| INGREDIENTS | WEIGHT (GM) |
|---|---|
| Portion 1 | |
| Methacrylic acid monomer | 74.2 |
| Ethoxytriethyleneglycol methacrylate monomer | 8.3 |
| Isopropanol | 530.5 |
| Acetone | 77.5 |
| Portion 2 | |
| Diaquabis(borondifluorodiphenyl glyoximato) cobaltate (II), Co(DPG—BF$_2$) | 0.11 |
| 2,2'-azobis(2,4-dimethylvaleronitrile), (Vazo ® 52 by DuPont Co., Wilmington, DE) | 0.81 |
| Acetone | 21.5 |
| Portion 3 | |
| Methacrylic acid monomer | 296.6 |
| Ethoxytriethyleneglycol methacrylate monomer | 32.9 |
| Portion 4 | |
| Diaquabis(borondifluorodiphenyl glyoximato) cobaltate (II), Co(DPG—BF$_2$) | 0.22 |
| 2,2'-azobis(2,4-dimethylvaleronitrile), (Vazo ® 52 by DuPont Co., Wilmington, DE) | 9.75 |
| Acetone | 100.0 |
| Portion 5 | |
| 2,2'-azobis(2,4-dimethylvaleronitrile), (Vazo ® 52 by DuPont Co., Wilmington, DE) | 0.8 |
| Acetone | 28.5 |

The Portion 1 mixture was charged into a 3 liter flask equipped with a thermometer, stirrer, additional funnels, reflux condenser and a means of maintaining a nitrogen blanket over the reactants. The mixture was heated to reflux temperature and refluxed for about 20 minutes. The Portion 2 solution was added. Subsequently, Portion 3 and 4 were simultaneously added while the reaction mixture was held at reflux temperature at about 72° C. The addition of Portion 3 and 4 was completed in 3 hours. When the addition of Portion 4 was completed, the Portion 5 was added and the reaction mixture was refluxed for another 45 minutes. The solution was cooled to room temperature. The resulting macromonomer solution was a clear thin polymer solution and had a solid content of about 32.2%. The macromonomer contained 10% of ethoxytriethyleneglycol methacrylate and 90% of methacrylic acid and had a weight averge molecular weight of 2,660 and a number average molecular weight of 1,570 as measured by Gel Permeation Chromatography (GPC) on a methylated macromonomer sample using polymethyl methacrylate as the standard.

Example 5

This shows the preparation of macromonomer ethoxytriethyleneglycol methacrylate-co-methacrylic acid, 5/95 by weight

| INGREDIENTS | WEIGHT (GM) |
|---|---|
| Portion 1 | |
| Methacrylic acid monomer | 78.3 |
| Ethoxytriethyleneglycol methacrylate monomer | 4.1 |
| Isopropanol | 530.5 |
| Acetone | 77.5 |
| Portion 2 | |
| Diaquabis(borondifluorodiphenyl glyoximato) cobaltate (II), Co(DPG—BF$_2$) | 0.11 |
| 2,2'-azobis(2,4-dimethylvaleronitrile), (Vazo ® 52 by DuPont Co., Wilmington, DE) | 0.54 |
| Acetone | 21.5 |
| Portion 3 | |
| Methacrylic acid monomer | 313.0 |
| Ethoxytriethyleneglycol methacrylate monomer | 16.5 |
| Portion 4 | |
| Diaquabis(borondifluorodiphenyl glyoximato) cobaltate (II), Co(DPG—BF$_2$) | 0.22 |
| 2,2'-azobis(2,4-dimethylvaleronitrile), (Vazo ® 52 by DuPont Co., Wilmington, DE) | 6.5 |
| Acetone | 100.0 |
| Portion 5 | |
| 2,2'-azobis(2,4-dimethylvaleronitrile), (Vazo ® 52 by DuPont Co., Wilmington, DE) | 0.5 |
| Acetone | 28.5 |

The procedure was similar to Example 4. The resulting macromonomer solution had a very slight haze indicating the marginal solubility of this macromonomer in the solvent mixture of isopropanol and acetone, 70% to 30% by weight. It had a solid content of about 30.5%. The macromonomer contained 5% of ethoxytriethyleneglycol methacrylate and 95% of methacrylic acid and had a weight averge molecular weight of 2,280 and a number average molecular weight of 1,460 as measured by Gel Permeation Chromatography (GPC) on a methylated macromonomer sample using polymethyl methacrylate as the standard.

Example 6

This shows the preparation of macromonomer ethoxytriethyleneglycol methacrylate-co-methacrylic acid, 2/98 by weight.

| INGREDIENTS | WEIGHT (GM) |
|---|---|
| Portion 1 | |
| Methacrylic acid monomer | 80.8 |
| Ethoxytriethyleneglycol methacrylate monomer | 1.6 |
| Isopropanol | 455.0 |
| Acetone | 153.0 |
| Portion 2 | |
| Diaquabis(borondifluorodiphenyl glyoximato) cobaltate (II), Co(DPG—BF$_2$) | 0.049 |
| 2,2'-azobis(2,4-dimethylvaleronitrile), (Vazo ® 52 by DuPont Co., Wilmington, DE) | 0.54 |
| Acetone | 21.5 |
| Portion 3 | |
| Methacrylic acid monomer | 322.9 |
| Ethoxytriethyleneglycol methacrylate monomer | 6.6 |
| Portion 4 | |
| Diaquabis(difluorodiphenyl glyoximato) cobaltate (II), Co(DPG—BF$_2$) | 0.098 |
| 2,2'-azobis(2,4-dimethylvaleronitrile), (Vazo ® 52 by DuPont Co., Wilmington, DE) | 6.5 |
| Acetone | 100.0 |
| Portion 5 | |
| 2,2'-azobis(2,4-dimethylvaleronitrile), (Vazo ® 52 by DuPont Co., Wilmington, DE) | 1.0 |
| Acetone | 28.0 |

The procedure was similar to Example 4. Towards the end of the reaction, the polymer had a minor tendency of precipitating from the solution, especially when the reflux was vigorous. However, the presence of the polyoxyethylene containing comonomer, even at as low a concentration as 2%, changed the solubility enough to allow for the completion of the reaction and very efficient polymer conversion. The resulting macromonomer solution was cloudy indicating again the marginal solubility of this macromonomer in the solvent mixture of isopropanol and acetone, 60% to 40% by weight. It had a solid content of about 33.5%. The macromonomer contained 2% of ethoxytriethyleneglycol methacrylate and 98% of methacrylic acid and had a weight averge molecular weight of 5,410 and a number average molecular weight of 2,530 as measured by Gel Permeation Chromatography (GPC) on a methylated macromonomer sample using polymethyl methacrylate as the standard.

Example 7

This shows the preparation of macromonomer Poly (oxyethylene glycol 400 (molecular weight of 400)) methacrylate-co-methacrylic acid, 15/85 by weight

| INGREDIENTS | WEIGHT (GM) |
|---|---|
| Portion 1 | |
| Methacrylic acid monomer | 70.1 |
| Poly(oxyethyleneglycol 400) monomethacrylate monomer, Polysciences, Inc., Warrington, PA | 12.4 |
| Isopropanol | 530.5 |
| Acetone | 77.5 |
| Portion 2 | |
| Diaquabis(borondifluorodiphenyl glyoximato) cobaltate (II), Co(DPG—BF$_2$) | 0.1035 |
| 2,2'-azobis(methylbutyronitrile), (Vazo ® 67 by DuPont Co., Wilmington, DE) | 0.78 |
| Acetone | 21.5 |

| INGREDIENTS | WEIGHT (GM) |
|---|---|
| Portion 3 | |
| Methacrylic acid monomer | 280.1 |
| Poly(oxyethyleneglycol 400) monomethacrylate | 49.4 |
| Portion 4 | |
| Diaquabis(borondifluorodiphenyl glyoximato) cobaltate (II), Co(DPG—BF$_2$) | 0.1035 |
| 2,2'-azobis(methylbutyronitrile), (Vazo ® 67 by DuPont Co., Wilmington, DE) | 4.5 |
| Acetone | 47.5 |
| Portion 5 | |
| Diaquabis(borondifluorodiphenyl glyoximato) cobaltate (II), Co(DPG—BF$_2$) | 0.041 |
| 2,2'-azobis(2,4-dimethylvaleronitrile), (Vazo ® 52 by DuPont Co., Wilmington, DE) | 2.3 |
| Acetone | 40.5 |
| Portion 6 | |
| Diaquabis(borondifluorodiphenyl glyoximato) cobaltate (II), Co(DPG—BF$_2$) | 0.062 |
| 2,2'-azobis(2,4-dimethylvaleronitrile), (Vazo ® 52 by DuPont Co., Wilmington, DE) | 2.3 |
| Acetone | 40.5 |

The procedure described in Example 3 was used to prepare the macromonmer. The resulting macromonomer solution was a clear thin polymer solution and had a solid content of about 33.8%. The macromonomer contained 15% of poly(oxyethylene glycol 400) methacrylate and 85% of methacrylic acid and had a weight averge molecular weight of 3,660 and a number average molecular weight of 2,070 as measured by Gel Permeation Chromatography (GPC) on a methylated macromonomer sample using polymethyl methacrylate as the standard.

Example 8

This shows the preparation of macromonomer Poly (oxyethylene glycol 1000 (molecular weight 0f 1000)) methacrylate-co-methacrylic acid, 15/85 by weight

| INGREDIENTS | WEIGHT (GM) |
|---|---|
| Portion 1 | |
| Methacrylic acid monomer | 70.1 |
| Poly(oxyethyleneglycol 1000) monomethacrylate monomer, Polysciences, Inc., Warrington, PA | 12.4 |
| Isopropanol | 530.5 |
| Acetone | 77.5 |
| Portion 2 | |
| Diaquabis(borondifluorodiphenyl glyoximato) cobaltate (II), Co(DPG—BF$_2$) | 0.1035 |
| 2,2'-azobis(methylbutyronitrile), (Vazo ® 67 by DuPont Co., Wilmington, DE) | 0.78 |
| Acetone | 21.5 |
| Portion 3 | |
| Methacrylic acid monomer | 280.1 |
| Poly(oxyethyleneglycol 400) monomethacrylate | 49.4 |
| Portion 4 | |
| Diaquabis(borondifluorodiphenyl glyoximato) cobaltate (II), Co(DPG—BF$_2$) | 0.1035 |
| 2,2'-azobis(methylbutyronitrile), (Vazo ® 67 by DuPont Co., Wilmington, DE) | 4.5 |
| Acetone | 47.5 |
| Portion 5 | |
| Diaquabis(borondifluorodiphenyl glyoximato) cobaltate (II), Co(DPG—BF$_2$) | 0.041 |
| 2,2'-azobis(2,4-dimethylvaleronitrile), (Vazo ® 52 by DuPont Co., Wilmington, DE) | 2.3 |
| Acetone | 40.5 |
| Portion 6 | |
| Diaquabis(borondifluorodiphenyl glyoximato) cobaltate (II), Co(DPG—BF$_2$) | 0.062 |
| 2,2'-azobis(2,4-dimethylvaleronitrile), (Vazo ® 52 by DuPont Co., Wilmington, DE) | 2.3 |
| Acetone | 40.5 |

The procedure described in Example 3 was used to prepare the macromonmer. The resulting macromonomer solution was a clear thin polymer solution and had a solid content of about 32.3%. The macromonomer contained 15% of poly(oxyethylene glycol 1000) methacrylate and 85% of methacrylic acid and had a weight averge molecular weight of 4,290 and a number average molecular weight of 2,290 as measured by Gel Permeation Chromatography (GPC) on a methylated macromonomer sample using polymethyl methacrylate as the standard.

Example 9

This illustrates the preparation of a block copolymer, n-butyl methacrylate-b-ethoxytriethyl-eneglycol methacrylate-co-methacrylic acid, 58.5//6.2/35.3 by weight, from a macromonomer.

| INGREDIENTS | WEIGHT (GM) |
|---|---|
| Portion 1 | |
| Macromonomer of Example 3 | 157.7 |
| 2-Pyrrolidone | 40.0 |
| Portion 2 | |
| 2,2'-azobis(2,2-dimethylvaleronitrile), (Vazo ® 52, by DuPont Co., Wilmington, DE) | 0.5 |
| Acetone | 10.0 |
| Portion 3 | |
| n-Butyl methacrylate | 70.4 |
| Portion 4 | |
| 2,2'-azobis(2,4-dimethylvaleronitrile), (Vazo ® 52, by DuPont Co., Wilmington, DE) | 2.0 |
| Acetone | 20.0 |
| Portion 5 | |
| 2,2'-azobis(2,4-dimethylvaleronitrile), (Vazo ® 52, by DuPont Co., Wilmington, DE) | 0.5 |
| Acetone | 10.0 |

The Portion 1 mixture was charged into a 500 mL flask equipped with a thermometer, stirrer, additional funnels, reflux condenser and a means of maintaining a nitrogen blanket over the reaction mixture. The mixture was heated to reflux temperature and refluxed for about 10 minutes. The Portion 2 solution was added. Subsequently, Protion 3 and 4 were simultaneously added while the reaction mixture was held at the reflux temperature of about 76° C. The addition of Portion 3 and 4 were completed in 3 hours. The Portion 5 solution was added. The reaction mixture was refluxed at about 69° C. for 90 minutes. The mixture was distilled until about 80.1 g of volatiles were collected and 92.4 g of 2-pyrrolidone were added to yield 231.0 g of a 47.3% polymer solution. This block copolymer contains 58.5% by weight of a homopolymer of n-butyl methacrylate in one block and a random copolymer of 6.2% by weight of ethoxytriethyleneglycol methacrylate and 35.3% by weight of methacrylic acid in the other block. The block copolymer had a weight averaged molecular weight of 4,851 and a number averaged molecular weight of 2,839 as measured by Gel Permeation Chromatography (GPC) using polystyrene as the standard.

Example 10

The block polymer of Example 9 was neutralized using the following procedure:

42.3 g of the polymer were mixed with 12.0 g of potassium hydroxide solution (45.6% in deionized water) and 147.8 g of deionized water until a homogeneous 10% polymer solution was obtained. The pH of the polymer solution was 8.5.

The polymer solution was mixed with 40 g of FW18 carbon black (Degussa Corp., Allendale, N.J.) and 157.9 g of deionized water in a high speed disperser, Dispermant® FE (BYK-Gardener, Inc., Silver Spring, Md.). The mixture was stirred at about 6000 rpm for 0.5 hour. The mixture was then processed with a microfluidizer (Microfluidics Corp., Watham, Mass.) by passing it through the interaction chamber 5 times under a liquid pressure of about 10,000 psi. The resulting pigment dispersion had 10% pigment concentration with an average particle size of 113 nm as determined by Brookhaven BI-90 particle sizer, and a pH of 8.17.

This pigment dispersion concentrate was let down with a vehicle solution to give the following composition.

| INGREDIENT | AMOUNT (WT %) |
| --- | --- |
| Carbon Black, FW18 | 2.75 |
| Dispersant | 1.25 |
| 2-Pyrrolidone (Aldrich Chemical Co., Milwaukee, WI) | 5.0 |
| N-Methylpyrrolidone (Aldrich Chemical Co., Milwaukee, WI) | 2.0 |
| Liponic ® EG-1 (Lipo Chemicals, Inc., Paterson, NJ) | 4.25 |
| Zonyl ® FSA (DuPont Co., Wilmington, DE) | 0.05 |
| Proxel ® G (Zeneca Inc., Wilmington, DE) | 0.15 |
| Deionized water | 84.6 |

The ink was filled into a thermal ink jet pen and printed with a Hewlett Packard DeskJet ink jet printer (Hewlett Packard Co., Palo Alto, Calif.) on Gilbert bond paper (25% cotton, Mead Co., Dayton, Ohio). It printed smoothly and the print had a high optical density of 1.33 and sharp edges. The print was waterfast immediately after drying.

The ink appeared to be stable. No flocculation was detected after the ink sample had been subjected to 4 temperature cycles, each consisting of 4 hours at −20° C. and 4 hours at 70° C.

What is claimed is:

1. A macromonomer composition, wherein at least 80 mol % of the macromonomer comprises:

(I) a random copolymer of 2 to 1,000 units of monomers, wherein the random copolymer contains:

(a) at least 50% by weight, based on the total weight of the macromonomer, of at least one comonomer having the formula:

$$CH_2\!=\!C(R_2)(C(O)OH)$$

wherein $R_2$ is H or $CH_3$; and (b) approximately 2 to 50% by weight, based on the total weight of the macromonomer, of at least one monomer of the formula:

$$CH_2\!=\!C(R_3)(C(O)OX_n(CH_2CH_2O)_m\!-\!R_4)$$

wherein n is 0 or 1; X is an alkylene, arylene, or alkylarylene connecting group of 1 to 9 carbon atoms; m is 2 to 50; $R_3$ is H or $CH_3$; and $R_4$ is H or an alkyl group of 1 to 4 carbon atoms; and (II) an end group linked to the random copolymer and having the formula:

$$CH_2\!=\!C(C(O)OR_1(CH_2)\text{---}$$

wherein $R_1$ is selected from the group consisting of H, an alkyl group of 1 to 8 carbon atoms, a hydroxyalkyl group of 1 to 8 carbon atoms, and $X_n(CH_2CH_2O)_m\!-\!R_4$ wherein n is 0 or 1, X is an alkylene, arylene, or alkylarylene connecting group of 1 to 9 carbon atoms, m is 2 to 50, and $R_4$ is H or an alkyl group of 1 to 4 carbon atoms.

2. The macromonomer of claim 1 wherein monomer (a) is a methacrylic acid monomer.

3. The macromonomer of claim 1 wherein n is 0, m is 3 to 10, $R_3$ is $CH_3$ and $R_4$ is H, $CH_3$, or $C_2H_5$.

4. The macromonomer of claim 1 wherein monomer (b) is selected from the group consisting of 2-(2-methoxyethoxy) ethyl acrylate, 2-(2-methoxyethoxy) ethyl methacrylate, ethoxytriethyleneglycol methacrylate, methoxy polyethyleneglycol monomethacrylate (molecular weight of 200 to 100), and polyethyleneglycol monomethacrylate having a molecular weight of 200 to 1000.

5. The macromonomer of claim 4 wherein monomer (a) is a methacrylic acid monomer and monomer (b) is a ethoxytriethylene-glycol methacrylate monomer.

6. The macromonomer of claim 4 wherein monomer (a) is a methacrylic acid monomer and monomer (b) is poly (oxyethylene glycol) monomethacrylate monomer.

7. The macromonomer of claim 1 further containing up to 10% of an alkyl methacrylate monomer wherein the alkyl group has 1 to 8 carbon atoms.

8. The macromonomer of claim 1 further containing up to 10% of a hydroxyalkyl (meth)acrylate wherein the alkyl group has 1 to 8 atoms.

9. A process for free radical polymerization of an acid monomer and a comonomer, in the presence of a chain transfer agent in an organic solvent, to form a macromonomer having the following composition wherein at least 80 mol % of the macromonomer comprises:

(I) a random copolymer of 2 to 1,000 units of monomers; wherein the random copolymer contains:

(a) at least 50% by weight, based on the total weight of the macromonomer, of at least one monomer having the formula:

$$CH_2\!=\!C(R_2)(C(O)OH)$$

wherein $R_2$ is H or $CH_3$; and (b) approximately 2 to 50% by weight, based on the total weight of the macromonomer, of at least one monomer of the formula:

$$CH_2\!=\!C(R_3)(C(O)OX_n(CH_2CH_2O)_m\!-\!R_4)$$

wherein n is 0 or 1; X is an akyl, aryl, or alkaryl diradical connecting group of 1 to 9 carbon atoms; m is 2 to 50; $R_3$ is H or $CH_3$; and $R_4$ is H or an alkyl group of 1 to 4 carbon atoms; and (II) an end group linked to the random copolymer and having the formula:

$$CH_2=C(C(O)OR_1)(CH_2)-$$

wherein $R_1$ is selected from the group consisting of H, an alkyl group of 1 to 8 carbon atoms, a hydroxyalkyl group of 1 to 8 carbon atoms, and $X_n(CH_2CH_2O)_m-R_4$ wherein n is 0 or 1, X is an alkyl, aryl or alkaryl diradical connecting group of 1 to 9 carbon atoms, m is 2 to 50, and $R_4$ is H or an alkyl group of 1 to 4 carbon atoms.

10. The process of claim 9 wherein the chain transfer agent is a cobalt (II) or a cobalt (III) complex.

11. The process of claim 10 wherein the chain transfer agent is diaquabis(borondifluorodiphenyl glyoximato) cobaltate (II).

12. The process of claim 10 wherein the chain transfer agent is selected from the group consisting of isopropylaquabis(borondifluorodimethyl glyoximato) cobaltate (III), ethylaquabis(borondifluorodiphenyl glyoximato) cobaltate (III) and isopropylaquabis(borondifluorodiethyl glyoximato) cobaltate (III).

13. The process of claim 9 wherein monomer (a) is a methacrylacrylic acid monomer.

14. The process of claim 13 wherein wherein n is 0, m is 3 to 10, $R_3$ is $CH_3$ and $R_4$ is H, $CH_3$, or $C_2H_5$.

15. The process of claim 13 wherein monomer (b) is selected from the group consisting of 2-(2-methoxyethoxy) ethyl acrylate, 2-(2-methoxyethoxy) ethyl methacrylate, ethoxytriethyleneglycol methacrylate, methoxy polyethyleneglycol monomethacrylate (molecular weight of 200 to 100), and polyethyleneglycol monomethacrylate having a molecular weight 200 to 1000.

16. The process of claim 15 wherein monomer (a) is a methacrylic acid monomer and monomer (b) is a ethoxytriethylene-glycol methacrylate monomer.

17. The process of claim 15 wherein monomer (a) is a methacrylic acid monomer and monomer (b) is poly (oxyethylene glycol 400) monomethacrylate monomer.

18. The process of claim 15 wherein monomer (a) is a methacrylic acid monomer and monomer (b) is poly (oxyethylene glycol 1000) monomethacrylate monomer.

19. The process of claim 9 further containing up to 10% of an alkyl methacrylate monomer wherein the alkyl group has 1 to 8 carbon atoms.

20. The process of claim 9 further containing up to 10% of a hydroxyalkyl (meth) acrylate wherein the alkyl group has 1 to 8 carbon atoms.

* * * * *